Feb. 7, 1967 H. CANCRINUS ET AL 3,302,489

INERTIA FLUID TORQUE TRANSMITTER

Filed Oct. 7, 1963 2 Sheets-Sheet 1

HENDRIK CANCRINUS AND
ERIC HELMÜT FRIEDMANN
INVENTORS

BY Wenderoth, Lind & Ponack
ATTORNEYS

INERTIA FLUID TORQUE TRANSMITTER

Filed Oct. 7, 1963 2 Sheets-Sheet 2

HENDRIK CANCRINUS AND
ERIC HELMÜT FRIEDMANN
INVENTORS
BY Wenderoth, Lind & Ponack
ATTORNEYS United States Patent Office 3,302,489

Patented Feb. 7, 1967

3,302,489

INERTIA FLUID TORQUE TRANSMITTER

Hendrik Cancrinus and Eric Helmüt Friedmann, Cape Town, Cape Province, Republic of South Africa, assignors to Inpower Works (Proprietary) Limited, Cape Town, Cape Province, Republic of South Africa Filed Oct. 7, 1963, Ser. No. 314,340
Claims priority, application Republic of South Africa, Oct. 19, 1962, 62/4,388
20 Claims. (Cl. 74—752)

This invention relates to a fluid torque transmitter for the transmission of rotary power by inertia.

According to the invention, a torque transmitter comprises a carrier; at least one planet wheel mounted on the carrier to rotate about its own axis; a drum adapted for containing liquid and being co-axial with the carrier and a second axis, the carrier and drum being mounted to rotate about the second axis; drive connecting means connected to the carrier for connecting it to a source of rotary power; a sun wheel co-axial with the second axis; connecting means connected to the sun wheel for connecting it to a load to absorb rotary power; drive means for drivingly connecting the planet wheel with the sun wheel; a plurality of vanes of curved section for entrapping liquid and being fast with the planet wheel and spaced circumferentially away from and around the planet wheel axis, and having openings defined between inner and outer lips directed in one direction about the planet wheel axis, there being provided radial openings between the inner lips of adjacent vanes on the near side of the planet wheel axis, and also radial openings between the outer lips of adjacent vanes on the far side of the planet wheel axis; at least one curved inner shroud fast with the carrier and extending arcuately along part of the inner lips of the vanes for engaging sealingly with the inner lips of the vanes to seal off at least one radial opening between the lips of adjacent vanes for preventing rejection of entrapped liquid over the inner lips of the vanes; whereby when a quantity of liquid is placed in the drum, and when the carrier and the drum are rotated, the liquid is flung out in an annular layer against the inner peripheral surface of the drum under the action of centrifugal force, and whereby when the planet wheel rotates about its axis, the curved vanes pass through the annular layer of liquid and entrap liquid in them and displace the entrapped liquid inwardly away from the periphery of the drum in a direction towards the second axis, and whereby the inner shroud prevents the rejection of the liquid over the inner lips of the vanes until the vanes have rotated beyond the inner shroud, the mass of entrapped liquid being subjected to centrifugal force and generating a moment about the planet wheel axis which is transmitted via the planet wheel and drive means to the sun wheel, thus providing a torque about the second axis, available to drive a load.

The carrier and drum may be integral if desired, or alternatively the drum may be mounted to rotate freely around the carrier.

The drive connecting means for the carrier may include at least one toothed gear wheel connected to the vanes and mounted on the carrier to rotate about its own axis, internal teeth on the drum and meshing with the gear wheel, and input means for connecting the drum to a rotary power input; for transmitting rotary power from the drum via the internal gear teeth fast with the drum to the gear wheel and thence to the carrier.

The drive means may be adapted to transmit torque developed about the planet wheel axis to have the same direction about the second axis, the inner shroud being provided on that part of the vane wheel which trails the direction of rotation of the carrier. The planet and sun wheels may be toothed gear wheels, and the drive means may include a toothed idler mounted rotatably on the carrier and meshing simultaneously with the planet and sun wheels. Or the drive means may be provided by the sun wheel being substituted by an internally toothed gear and by the planet wheel being a toothed gear wheel meshing with the internally toothed gear. Or, as a further alternative, the drive means may be provided by the sun wheel and planet wheels being toothed sprockets, and by a chain meshing with the sprockets. The pitch of the sun and planet wheels may conveniently be the same.

The shroud may be provided on the trailing side of the planet wheel relative to the direction of rotation of the carrier about the second axis. If desired, both an inner and an outer shroud may be provided, the outer shroud extending arcuately around part of the outer periphery of the outer lips of the planet wheel for engaging sealingly with the outer lips of the vanes to seal off at least one radial outer opening between the lips of adjacent vanes for preventing rejection of liquid over the outer lips of the vanes.

A plurality of planet wheels may be provided, mounted in dynamic balance about the second axis.

Further features of the invention will become apparent from the following description with reference to the accompanying drawings.

Figure 1:
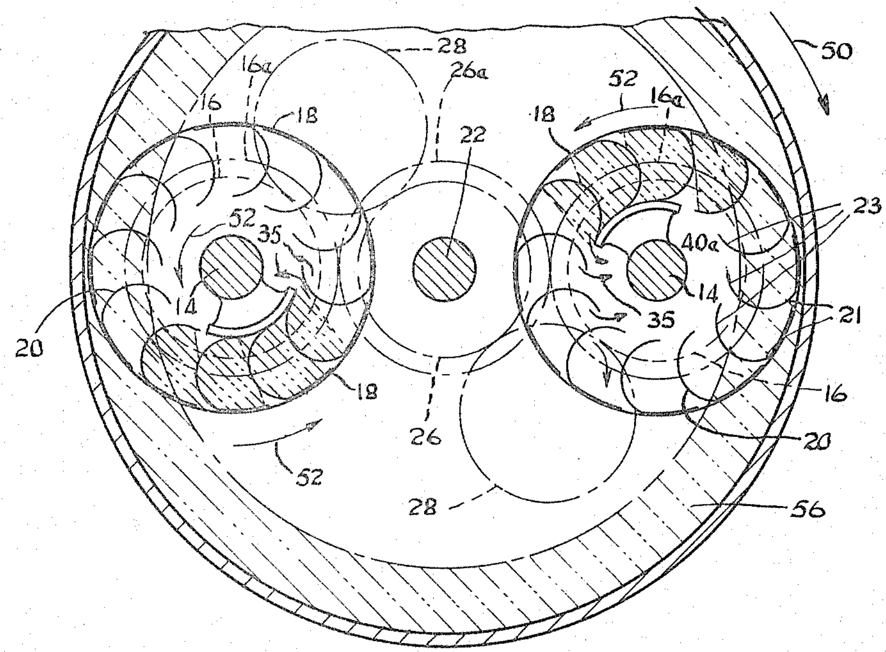
FIGURE 1 shows a sectional end elevation of one embodiment of the invention.

Referring to FIGURES 1 to 4 of the drawings, reference numeral 10 refers to an input shaft mounted to rotate about its axis, and having means for connection to a source of rotary power, and being integral with a carrier 12 carrying planet wheel pins 14 having their axes parallel to the input shaft axis. Planet wheels 16 are mounted to rotate about the axes of planet wheel pins 14 and are mounted in dynamic balance about the carrier axis. Fast with each planet wheel 16 there is provided a vane wheel 18 having side walls 19 and curved vanes 20. The vanes have outer lips 21 and inner lips 23.

Co-axial with the input shaft there is provided an output shaft 22 having means for connection to a load to absorb rotary power. The output shaft 22 has a stub 24 carried rotatably and co-axially in a bearing in a socket provided in the inner end of input shaft 10. Fast with the output shaft 22 there is provided a sun wheel which may be a gear wheel 26 or **26*a* (in FIGURE 1) or a toothed sprocket 26*b*** (in FIGURE 2).

Drive means drivingly connects the sun wheel 26, **26*a* or 26*b* with the planet wheels 16. The drive means may comprise planet wheel gear teeth 16*a* meshing directly with the sun wheel 26*a* (see FIGURE 1). Alternatively, if desired, an idler 28 may be provided for each planet wheel 26, and meshing with the sun wheel and the planet wheel 16, the idler wheels being mounted to rotate about the axes of pins 30 mounted in the carrier. As shown in FIGURE 2, the sun wheel and the planet wheels may be in the form of toothed sprockets 26*b* and 16*b* respectively. Chains 27 then drivingly connect the planet wheel sprocket 16*b* with the corresponding sun wheel sprocket 26*b***.

Figure 3:
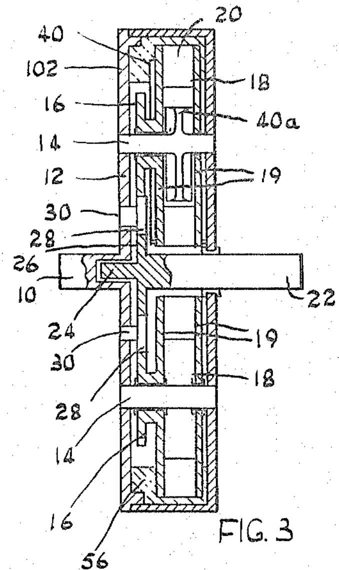
FIGURE 3 shows an axial section of an embodiment in which the drum and carrier are integral.

Referring to FIGURE 3 of the drawings, it will be noted that the carrier 12 is in the form of a drum adapted to contain liquid. The construction shown in FIGURE 4 of the drawings, while generally similar to that shown in FIGURE 3, has a drum **12*a* around the carrier 12** and mounted freely rotatably about the carrier axis.

Figure 2:
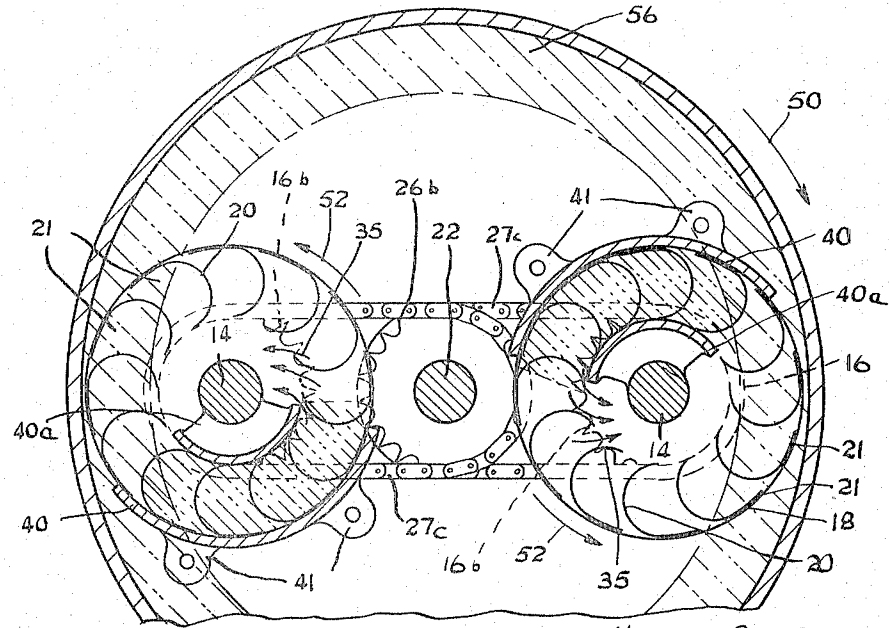
FIGURE 2 shows a sectional end elevational similar to FIGURE 1, but showing a combination of inner and outer shrouds, and a different drive means.

Referring to FIGURES 1 and 2 of the drawings, a curved inner shroud **40*a* is provided spaced along the inner periphery of the vane wheel 18, i.e. along the inner lips 23 of the vanes 20, so that shroud 40*a* sealingly engages with inner lips 23. The shroud 40*a* may be fast with the carrier 12 or with the pins 14**, which are themselves fast with the carrier.

Referring to FIGURE 2 of the drawings and the right-hand side thereof, it will be noted that an outer shroud 40, and an inner shroud **40*a* are provided. The outer shroud 40 is provided with lips 41 for attachment to the carrier 12. Shroud 40 engages sealingly with the outer lips 21 of the vanes 20**.

In considering the operation, it will be convenient to consider the construction where sun and planet wheel pitch diameters are equal and in which there is an idler 28 meshing directly with them. In operation (considering the embodiment shown in FIGURE 1), rotary power applied to the input shaft and adapted to produce rotation in the direction of arrow 50, and while the output shaft is stationary, or rotating at a speed less than that of the input shaft, will cause the planet wheels to rotate about their own axes relative to the carrier in the direction of arrow 52. It will be realized that, the carrier 12 being fast with the input shaft, the carrier itself is rotated in that direction thus causing the idler wheels 28 to roll on the sun wheel 26, as long as there is a difference in speed between the output shaft and the input shaft.

Rotation of the carrier of the embodiment shown in FIGURE 1 causes liquid contained within the drum to be thrown out in an annular layer 56. As mentioned above, while there is a difference in speed between input and output shafts, the planet wheels will rotate about their axes relative to the carrier in the direction of arrow 52. This rotation will cause liquid to be scooped up from the annular layer 56 and to be retained in the vanes 20. Such retained liquid is subjected to centrifugal force, directed outwardly from the central region of the drum and resulting from the rotation of the drum and carrier about the second axis, and generates a moment about the planet wheel axis, which is transmitted via the planet wheel 16, and via idler wheel 28 (or as in FIGURE 2 via a chain and sprockets) to the sun wheel 26. The shrouds serve the function of increasing the volumetric capacity of the vanes, (which are slidably in engagement with the shrouds) over and above their normal capacity by preventing the rejection of fluid away from the central region of the drum and over the lips 21 and 23 of the vanes 20, in direction of arrows 35, thus ensuring that the spaces between adjacent vanes may be completely filled with liquid in the region where they engage with the shroud or shrouds. This over-filling takes place while the planet wheels are rotating relative to the carrier, that is during the start-up period or when an overload takes place, after having once started up, i.e. at a velocity ratio other than unity velocity ratio. When the planet wheels do not rotate about their axes relative to the carrier, the excess liquid, retained by the vanes and shrouds, will leak away, until only liquid contained within the vanes generates torque to drive the load. When sun wheel and planet wheel pitch diameters are the same, and when rotary power is applied to the carrier while the output shaft is stationary, the planet wheels will orbit about the carrier axis and will perform a motion which may be termed circular translation.

Referring to FIGURE 3 of the drawings, the inner shroud **40*a* is attached to the pin 14, and the outer shroud 40 is attached to the drum-cum-carrier 12**.

Figure 4:
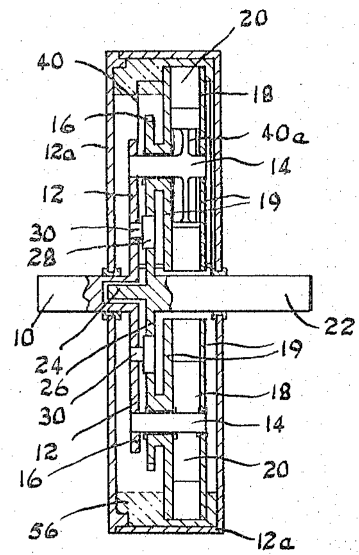
FIGURE 4 shows an axial section of an embodiment in which the drum is mounted freely rotatably about the carrier axis.

In the embodiment shown in FIGURE 4 of the drawings, the drum being mounted loosely about the carrier axis, that is about the second axis, will have its contents, namely the liquid, whirled around by the carrier and thus disposed in an annular layer in the drum. Friction between liquid and drum **12*a* causes the drum to rotate. The inner shroud 40*a* is attached to the pin 14, and the outer shroud 40 is attached to the carrier 12**.

As the output shaft rotation speeds up, that is, as the load is being driven faster and faster, so the rotation of the vane wheels 18 about their axes relative to the carrier slows down, until finally they come to a stop, and this happens when the liquid in the vanes on the one side exerts a sufficiently large moment about the planet wheel axis to balance the load torque on the output shaft, the moment being generated on the mass of the liquid as a result of centrifugal force due to rotation about the second axis.

Figure 5:
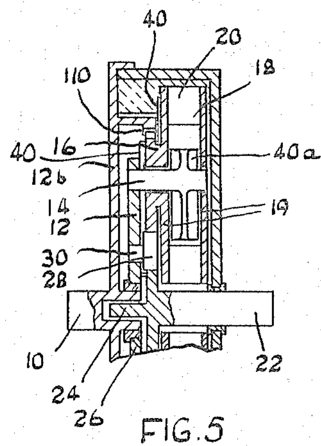
FIGURE 5 shows a fragmentary axial section of an embodiment in which the drum receives the power input, and the carrier is rotatably mounted relative to the drum about its axis.

Referring to FIGURE 5 of the drawings, the drum **12*b* is fast with input shaft 10, and the carrier 12 is mounted to be rotatable about the second axis. Drive connecting means for applying rotary power to the carrier includes internal gear teeth provided at 110 on the drum 12*b* and meshing with the gear teeth on the planet wheel 16. The inner shroud 40*a* is attached to the pin 14, and the outer shroud 40 is attached to the carrier 12**.

In operation of the embodiment shown in FIGURE 5, rotary power applied to the input shaft 10 will cause the drum **12*b* to rotate. The carrier will rotate within the drum at a speed exceeding that of the input speed to the drum, when the output shaft is stationary and hence when the sun wheel is stationary, and also when the output shaft has a speed less than that of the input shaft. Such rotation at different speeds will cause the planet wheels to rotate about their axes, and they will carry fluid inwardly from the outer layer 56 towards the central region of the drum. A moment is generated about the planet wheel axis as before and this is transmitted via the drive means onto sun wheel 26 and thence to output shaft 22**, torque thus generated being then available as an output torque on the output shaft. At unity velocity ratio between input and output shafts, the drum, the carrier, and output shaft will rotate in unison. As soon as an overload occurs then slip between input and output shafts will occur whereby there will be relative arcuate displacement between drum, carrier, and output shaft.

The embodiment of FIGURE 1 is shown to have an idler 28, but this may be omitted and then the planet wheel **16*a* will mesh directly with the sun wheel 26*a*. In such a modification, the carrier will rotate within the drum at a speed less than that of the input speed to the drum, when the output shaft is stationary and hence when the sun wheel is stationary and also when the output shaft has a speed less than that of the input shaft. Such rotation at different speeds will cause the planet wheels to rotate about their axes, and to function in a manner similar to the vane wheels of FIGURE 1, the moment about the planet wheel axes being transmitted, however, directly from planet wheel 16 to sun wheel 26*a***.

This invention has the characteristic, that it can transmit its full rated torque at unity velocity ratio that is without slip, and has a reserve torque overload transmitting capacity, but with slip. An increased torque is therefore available under overload over and above that available at unity velocity ratio, but such increased overload capacity is available only with slip.

Figure 6:
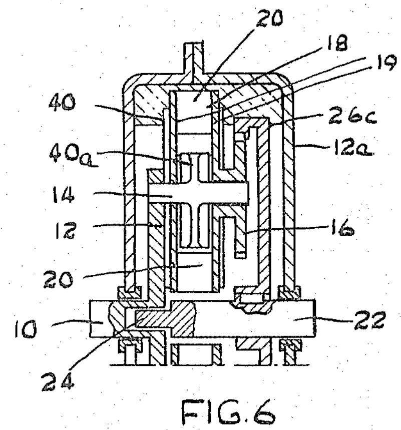
FIGURE 6 shows an axial section of an embodiment in which the sun gear is replaced by an internal gear.

Referring to FIGURE 6 of the drawings, like reference numerals refer to like parts of the other drawings. It will be noted, however, that the sun wheel is replaced by an internal gear **26*c* meshing directly with the planet wheel. The inner shroud 40*a* is attached to the pin 14, and the outer shroud 40 is attached to the carrier 12**.

The operation of this embodiment is similar to that of the other embodiments, except that by virtue of the difference in pitch diameters between planet and sun wheels, circular translation takes place at some ratio between input and output speeds, the ratio depending upon the ratio of the pitch diameters.

It was convenient to consider the operation of an embodiment having sun and planet wheel pitch diameters the same. Circular translation of the planet wheels then takes place when the output shaft is at rest and when rotary power is applied to the carrier. However, if the ratio between the sun and planet wheel diameters is other than unity, then circular translation of planet wheels will take place at some other relative speed between carrier and output shaft, and depending upon the pitch diameter ratio.

We claim:

1. A torque transmitter which comprises a carrier; at least one planet wheel mounted on the carrier to rotate about its own axis; a drum adapted for containing liquid and being co-axial with the carrier and a second axis, the carrier and drum being mounted to rotate about the second axis; drive connecting means connected to the carrier for connecting it to a source of rotary power; a driven wheel co-axial with the second axis; connecting means connected to the driven wheel for connecting it to a load to absorb rotary power; the planet wheel and the driven wheel being drivingly connected; a plurality of vanes of curved section for entrapping liquid and being fast with the planet wheel and spaced circumferentially away from and around the planet wheel axis, and having openings defined between inner and outer lips directed in one direction about the planet wheel axis, there being provided radial openings between the inner lips of adjacent vanes on the near side of the planet wheel axis, and also radial openings between the outer lips of adjacent vanes on the far side of the planet wheel axis; at least one curved inner shroud fast with the carrier and extending arcuately along part of the inner lips of the vanes for engaging sealingly with the inner lips of the vanes to seal off at least one radial inner opening between the lips of adjacent vanes for preventing rejection of liquid over the inner lips of the vanes; whereby when the quantity of liquid is placed in the drum, and when the carrier and the drum are rotated, the liquid is flung out in an annular layer against the inner peripheral surface of the drum under the action of centrifugal force, and whereby when the planet wheel rotates about its axis, the curved vanes pass through the annular layer of liquid and entrap liquid in them and displace the entrapped liquid inwardly away from the periphery of the drum in a direction towards the second axis, and whereby the inner shroud prevents the rejection of liquid over the inner lips of the vanes until the vanes have rotated beyond the inner shroud, the mass of entrapped liquid being subjected to centrifugal force and generating a moment about the planet wheel axis which is transmitted from the planet wheel to the driven wheel, thus providing a torque about the second axis, available to drive a load.

2. A torque transmitter according to claim 1, in which the carrier and drum are integral.

3. A torque transmitter according to claim 1, in which the drum is mounted to rotate freely around the carrier.

4. A torque transmitter according to claim 1, in which the drive connecting means for the carrier includes at least one toothed gear wheel connected to the vanes and mounted on the carrier to rotate about its own axis, internal teeth on the drum and meshing with the gear wheel, and input means for connecting the drum to a rotary power input; for transmitting rotary power from the drum via the internal gear teeth fast with the drum to the gear wheel and thence to the carrier.

5. A torque transmitter according to claim 1, in which a plurality of planet wheels are provided, mounted in dynamic balance about the second axis.

6. A torque transmitter according to claim 1, in which the driving connection between the planet wheel and the driven wheel transmits torque developed about the planet wheel axis in the opposite direction about the second axis, the inner shroud being provided on that part of the vane wheel which leads the direction of rotation of the carrier.

7. A torque transmitter according to claim 1, in which drive means is provided between said planet wheel and said driven wheel to transmit torque developed about the planet wheel axis in the same direction about the second axis, the inner shroud being provided on that part of the vane wheel which trails the direction of rotation of the carrier.

8. A torque transmitter according to claim 7, in which the driven wheel is an internally toothed gear, the planet wheel being a toothed gear wheel meshing with the internally toothed gear.

9. A torque transmitter according to claim 7, in which the planet and driven wheels are toothed gear wheels, and in which the drive means includes a toothed idler mounted rotatably on the carrier and meshing simultaneously with the planet and sun wheels.

10. A torque transmitter according to claim 7, in which the driven wheel and planet wheels are toothed sprockets, and the drive means is a chain meshing with the sprockets.

11. A torque transmitter which comprises a carrier; at least one planet wheel mounted on the carrier to rotate about its own axis; a drum for containing liquid and being co-axial with the carrier and a second axis, the carrier and drum being mounted to rotate about the second axis; drive connecting means connected to the carrier for connecting it to a source of rotary power; a driven wheel co-axial with the second axis; connecting means connected to the driven wheel for connecting it to a load to absorb rotary power; the planet wheel and the driven wheel being drivingly connected; a plurality of vanes of curved section for entrapping liquid and being fast with the planet wheel and spaced circumferentially away from and around the planet wheel axis, and having openings defined between inner and outer lips directed in one direction about the planet wheel axis, there being provided radial openings between the inner lips of adjacent vanes on the near side of the planet wheel axis, and also radial openings between the outer lips of adjacent vanes on the far side of the planet wheel axis; at least one curved inner shroud fast with the carrier and extending arcuately along part of the inner lips of the vanes for engaging sealingly with the inner lips of the vanes to seal off at least one radial inner opening between the lips of adjacent vanes for preventing ejection of entrapped liquid over the inner lips of the vanes; at least one curved outer shroud fast with the carrier and extending arcuately around part of the outer periphery of the outer lips of the planet wheel for engaging sealingly with the outer lips of the vanes to seal off at least one radial outer opening between the lips of adjacent vanes for preventing ejection of liquid over the outer lips of the vanes; whereby when a quantity of liquid is placed in the drum, and when the carrier and drum are rotated, the liquid is flung out in an annular layer against the inner peripheral surface of the drum under the action of centrifugal force, and whereby when the planet wheel rotates about its axis, the curved vanes pass through the annular layer of liquid and entrap liquid in them and displace the entrapped liquid inwardly away from the periphery of the drum in a direction towards the second axis, and whereby the inner shroud and outer shroud prevent the rejection of liquid over the inner lips and outer lips of the vanes respectively, until the vanes have rotated beyond the inner and outer shrouds respectively, the mass of entrapped liquid being subjected to centrifugal force and generating a moment about the planet wheel axis which is transmitted via the planet wheels to the sun wheels, thus providing a torque about the second axis, available to drive the load.

12. A torque transmitter according to claim 11, in which the carrier and drum are integral.

13. A torque transmitter according to claim 11, in which the drum is mounted to rotate freely around the carrier.

14. A torque transmitter according to claim 11, in which the drive connecting means for the carrier includes at least one toothed gear wheel connected to the vanes and mounted on the carrier to rotate about its own axis, internal teeth on the drum and meshing with the gear wheel, and input means for connecting the drum to a rotary power input; for transmitting rotary power from the drum via the internal gear teeth fast with the drum to the gear wheel and thence to the carrier.

15. A torque transmitter according to claim 11, in which drive means is provided between said planet wheel and said driven wheel to transmit torque developed about the planet wheel axis in the same direction about the second axis, the inner and outer shrouds being provided on that part of the vane wheel which trails the direction of rotation of the carrier.

16. A torque transmitter according to claim 15, in which the planet and driven wheels are toothed gear wheels, and in which the drive means includes a toothed idler mounted rotatably on the carrier and meshing simultaneously with the planet and driven wheels.

17. A torque transmitter according to claim 15, in which the driven wheel is an internally toothed gear, and planet wheel being a toothed gear wheel meshing with the internally toothed gear.

18. A torque transmitter according to claim 15, in which the driven wheel and planet wheel are toothed sprockets, and said drive means is a chain meshing with the sprockets.

19. A torque transmitter according to claim 11, in which the driving connection between the planet wheel and the driven wheel transmits torque developed about the planet wheel axis in the opposite direction about the second axis, the inner and outer shrouds being provided on that part of the vane wheel which leads the direction of rotation of the carrier.

20. A torque transmitter according to claim 11, in which a plurality of planet wheels are provided, mounted in dynamic balance about the second axis.

References Cited by the Examiner

UNITED STATES PATENTS

| | | | |
|---|---|---|---|
| 1,099,464 | 6/1914 | Olson | 74—789 |
| 1,507,369 | 9/1924 | Escott | 74—774 |
| 1,666,152 | 4/1928 | Strigl | 74—774 |
| 1,691,610 | 11/1928 | Reece et al. | 74—752 |
| 1,912,323 | 5/1933 | Taylor | 192—58 |
| 1,988,405 | 1/1935 | Walton | 74—752 |
| 2,183,403 | 12/1939 | Mitchell | 74—774 |
| 2,205,329 | 6/1940 | Wohlenhaus | 74—774 |
| 2,293,547 | 8/1942 | Hobbs | 74—774 |
| 3,077,793 | 2/1963 | Cancrinus | 74—752 |

DAVID J. WILLIAMOWSKY, *Primary Examiner.*

THOMAS C. PERRY, *Examiner.*